United States Patent [19]

Frank

[11] Patent Number: 4,677,786
[45] Date of Patent: Jul. 7, 1987

[54] SMALL ANIMAL TRAP WITH MULTIFINGERED BAIT HOLDER

[76] Inventor: Marc Frank, 1699 Koshkonong, Stoughton, Wis. 53589

[21] Appl. No.: 873,796

[22] Filed: Jun. 13, 1986

[51] Int. Cl.⁴ .......................................... A01M 23/30
[52] U.S. Cl. ...................................................... 43/82
[58] Field of Search ..................................... 43/81, 82

[56] References Cited

U.S. PATENT DOCUMENTS

| | | |
|---|---|---|
| 533,524 | 2/1895 | Brooks . |
| 869,594 | 10/1907 | Stone . |
| 1,405,229 | 1/1922 | Kopke . |
| 1,464,559 | 8/1923 | Britan ............................... 43/81 |
| 1,485,976 | 3/1924 | Gibbs . |
| 1,516,201 | 11/1924 | Nebel . |
| 1,781,163 | 11/1930 | Clarkson ............................ 43/81 |
| 1,852,249 | 4/1932 | McCreary ........................... 43/81 |
| 2,175,754 | 10/1939 | Harrison ............................ 43/58 |
| 2,260,872 | 10/1941 | Schmidt ............................. 43/81 |
| 2,581,628 | 1/1952 | Burwell .............................. 43/81 |
| 2,793,465 | 5/1957 | Tramel .............................. 43/81 |
| 3,031,793 | 5/1962 | Waterman ............................ 43/81 |
| 3,058,256 | 10/1962 | Wernham et al. ..................... 43/81 |
| 3,968,589 | 7/1976 | Basham .............................. 43/81 |

Primary Examiner—Gene P. Crosby
Attorney, Agent, or Firm—Isaksen, Lathrop, Esch, Hart & Clark

[57] ABSTRACT

A small animal trap includes a base, a jaw pivotally mounted to the base and biased to close to one end of the base, a latch bar releasably holding the jaw in an open position, and a touch-sensitive trigger mechanism releasably connected to the latch bar. The trap has a bait holder with the flat base having a top surface and a multitude of resiliently flexible fingers extending upwardly therefrom to hold the bait in the interstices therebetween from where the bait can be removed by an animal only in a manner which would significantly disturb the trigger mechanism, thereby springing the trap.

15 Claims, 8 Drawing Figures

SMALL ANIMAL TRAP WITH MULTIFINGERED BAIT HOLDER

TECHNICAL FIELD

The present invention relates generally to small animal traps. In particular, the invention relates to small animal traps with a trigger mechanism having a bait holder.

DESCRIPTION OF THE PRIOR ART

Various types of small animal traps such as mouse and rat traps have been commercially available for a long period of time. One common type of trap includes a base upon which is mounted a pivoting cross pin, a movable jaw which is connected to the ends of the cross pin or which may be of single structure with the cross pin, a coiled spring of which a portion extends to the base to resist turning of the spring and another arm which extends from the spring to engage and bear against the jaw so that the jaw is biased to close to one end of the trap, and a latch bar which is pivotally mounted to the other end of the trap by means of a staple mounted in the base holding the looped end of the latch bar. At the other end of the latch bar there is generally a curved portion which may even form a partial hook. These small animal traps also generally include a small touch-sensitive trigger mechanism which is pivotally mounted to some portion of the trap, generally to either a staple in the base or to the cross pin. At one end of the trigger mechanism is a latching portion which has a hole adapted to receive and releasably hold the curved end portion of the latch bar when the trap is set. At the other end of the trigger mechanism is the bait holder. When a small animal comes to try to eat the bait held in the bait holder, the touch-sensitive trigger mechanism is jarred so that the curved end portion of the latch bar is removed from the hole in the latching portion of the trigger mechanism. This frees the latch bar to pivot out of the way of the spring actuated jaw which pivotally rotates to trap and kill the animal.

Touch-sensitive mechanisms which are generally pivotally mounted to the cross pin or to a staple in the base have been designed with several different types of bait holders. The most common type of mouse trap has a protrusion in the trigger mechanism which is designed to receive and hold the bait. This type of bait holder is not particularly effective for holding pasty substances such as peanut butter or for holding small crumbled substances such as crumbled crackers or bread crumbs, nor is it very effective in holding very small particles of bait such as small seeds. On this type of bait holder pasty substances such as peanut butter are completely exposed and therefore may often be removed from the bait holder by the small animal without sufficiently disturbing the trigger mechanism to spring the trap. The bait holder does not hold small seeds or crumbs very effectively because there is nothing on the flat surface of the trigger mechanism to retain the small particles. If the trap is moved or disturbed in any manner, the crumbs may simply fall off of the trigger mechanism. Furthermore, if any of the small particles remain on the trigger mechanism, a small animal may easily remove them without springing the trap.

Various traps have been designed with small touch-sensitive trigger mechanisms having bait holders which overcome some of these problems. For example, the bait container for animal traps disclosed in U.S. Pat. No. 2,175,754 to Harrison is a small foraminous basket-like container with a pivoting and self-hooking cover. This bait holder is designed to hold a fairly large amount of bait in the interior of the basket in such a manner that an animal will not be able to entirely remove the bait from the basket. As a result the animal will make a desperate attempt to get the bait and therefore trip the trap. This basket-like bait holder is sufficient for holding paste-like substances such as peanut butter in such a manner that the animal will not entirely be able to remove the substance therefrom; however, the basket-like structure has some parts which are soldered and is relatively complicated and expensive to manufacture. Furthermore, the basket-like structure would not hold small particles, such as crumbled crackers or particulate bait. In U.S. Pat. No. 3,058,256 to Wernham, et al. a prebaited trap is disclosed which has a bait holder comprised of two plastic jaws forming a substantially tubular receptacle with an opening at one end for receiving bait and spaced ribbed elements for exposing the bait material received therein and for protecting the bait material from attack by small animals. The receptacle would require that a fairly large amount of the paste-like substance be placed in the receptacle for the paste to extrude through the ribs and be exposed. Since there is an opening in the bottom of the receptacle, the receptacle cannot readily hold small particles of bait such as cracker crumbs or small seeds.

Accordingly, there is a need for a small animal trap which has a touch-sensitive mechanism with a bait holder which is suitable for receiving and holding small amounts of paste-like substance and small particles of bait in such a manner that it makes it difficult for the animal to remove the bait.

SUMMARY OF THE INVENTION

The present invention is a small, simple, inexpensively manufactured animal trap with a trigger mechanism which is able to very effectively hold small amounts of pasty substance and small particles of bait in such a manner that the bait is neither easily knocked off the bait holder nor easily removed by the animal attempting to take the bait. An animal will not be able to take the bait from the touch-sensitive trigger mechanism bait holder of the present invention without thereby actuating the trap.

The preferred trap of the present invention includes a base, a cross pin which is pivotally mounted to the base by means of staples at the ends thereof, a jaw for trapping the animal which is connected to the ends of the cross pin so that the jaw may pivot back and forth between the two ends of the base, a coiled spring for actuating the jaw, the spring being mounted on the cross pin and having a portion extending from the spring to the base to provide resistance against the turning of the spring and also having an arm extending therefrom to engage and bear against the jaw, thereby biasing the jaw to close toward the trapping end of the trap. The trap also includes a latch bar which has a loop at one end through which it is pivotally mounted by a staple to an end of the base opposite the end to which the jaw tends to close, and a curved end portion near the other end of the latch bar, a touch-sensitive trigger mechanism which includes a trigger bar having a latching portion at one end of the bar with a hole therein adapted to receive and releasably hold the curved end portion of the latch bar when the trap is set. A bait holder is mounted at the end of the trigger bar and has a flat base with a top surface and a multitude of fingers extending therefrom to hold the bait in the interstices therebetween. The trigger bar is pivotally mounted to the base in such a fashion that the latching portion of the trigger bar may receive and hold the curved end portion of the latched bar when the trap is set, and release the latch bar when the trigger bar is disturbed so that the spring actuated jaw snaps to a closed position.

The multifingered bait holder serves to receive and hold small amounts of paste-like baits, chunks of bread and small bait particles in such a fashion that they neither spill out of the bait holder nor are easily removed by the animal which is to be trapped, and yet is simple in structure and may be manufactured inexpensively. The multifingered bait holder retains the bait in such a manner that an animal may see and smell and even feel the bait but will have great difficulty in removing all of the bait, causing the animal to desperately jar the touch-sensitive mechanism and spring the trap. The bait holder is easily baited by dropping small particles such as seeds or cracker crumbs into the interstices between the fingers or by smearing a paste-like substance such as peanut butter across the tops of the fingers and pushing the substance down into the interstices between the fingers.

Other objects, features, and advantages of the invention will be apparent from the following detailed description taken in conjunction with the accompanying drawings showing a preferred embodiment of the invention.

DESCRIPTION OF THE PREFERRED EMBODIMENT

Figure 1:
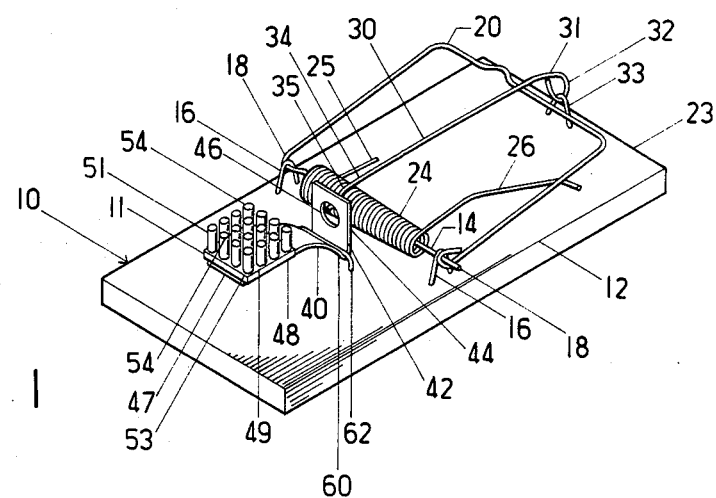
FIG. 1 is a perspective view of a small animal trap with multifingered bait holder according to the present invention.

Referring more particularly to the drawings, wherein like numbers refer to like parts, FIG. 1 shows a small animal trap 10 with a multifingered bait holder 11 having a base 12, a cross pin 14 which is pivotally mounted to the base by means of staples 16 near the ends 18 of the cross pin 14, a jaw 20 for trapping the animal which is connected to the ends 18 of the cross pin 14 in such a manner that the jaw 20 may pivot back and forth between the two ends 22, 23 of the base 12. The trap 10 further includes a coil spring 24 which has a portion 25 extending to the base 12 to provide resistance against any turning of the spring 24, and at least one arm 26 extending to engage and bear against the jaw so that the jaw tends close to a trapping end 22 of the base 12.

The present invention also includes a latch bar 30 which has a loop 32 at one end 31 through which it is pivotally mounted by a staple 33 to a latching end 23 of the base 12 which is opposite the trapping end 22 to which the jaw 20 is biased to close. The latch bar 30 also has a curved end portion 34 near the opposite end 35 of the latch bar 30. Additionally, the small animal trap 10 includes a small touch-sensitive trigger mechanism. This type of trigger mechanism generally includes a trigger bar 40 with a latching portion 42 at one end 44 of the trigger bar 40 which includes an opening 46 adapted to receive and releasably hold the curved end portion 34 of the latch bar 30 when the trap is set, and release the latch bar 30 when the trigger bar 40 is disturbed, thereby allowing the spring actuated jaw 20 to snap to a closed position to trap the animal at the trapping end 22 of the trap 10.

Figure 2:
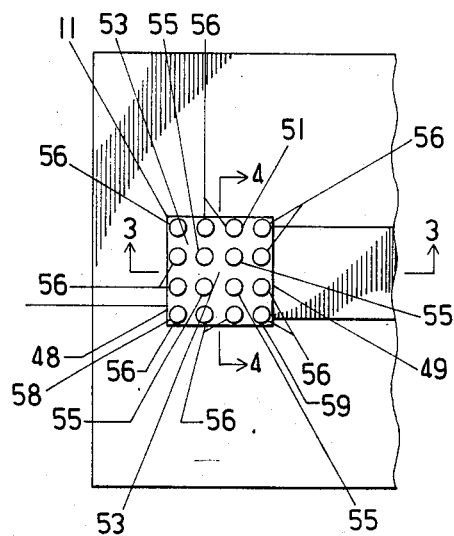
FIG. 2 is a plan view of the multifingered bait holder and a portion of the trap therearound.
Figure 3:
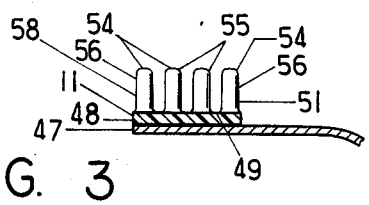
FIG. 3 is a section view taken along section line 3—3 of FIG. 2.
Figure 4:
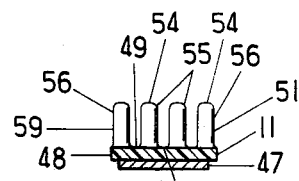
FIG. 4 is a section view taken along section line 4—4 of FIG. 2.
Figure 5:
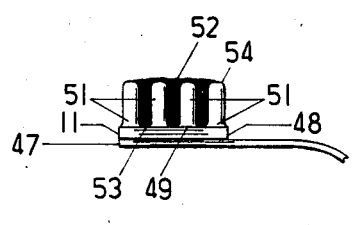
FIG. 5 is a side elevation of the multifingered bait holder filled with a paste-like bait substance.

At the end 47 of the trigger bar 40 opposite the latching portion 46 is mounted the bait holder 11 which has a flat base 48 with a top surface 49 and a multitude of fingers 51 extending upwardly from the top surface 49 to hold the bait 52, as shown in FIG. 5, in the interstices 53 between the flexible fingers 51. Referring to FIGS. 2, 3 and 4, the bait holder 11 has sixteen fingers 51 arranged in four parallel rows 58 and four parallel columns 59 of four fingers 51 each. The fingers 51 have top ends 54 which are rounded to facilitate insertion of bait preferably as shown in FIGS. 3-5. All of the fingers 51 may be of equal height. The fingers and base may be molded in one piece of plastic, and the fingers may thus be made resiliently flexible so that small, hard baits, such as seeds can be pressed in between the fingers and will be firmly held therein. However, the fingers may also be formed of relatively stiff material, such as metal.

Figure 7:
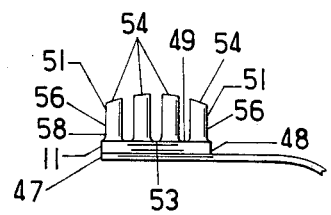
FIG. 7 is a side elevation view of an alternate embodiment of the multifingered bait holder.
Figure 8:
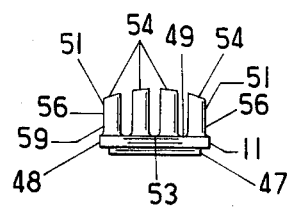
FIG. 8 is a front elevation view of of the multifingered bait holder of FIG. 7.

Referring to FIGS. 7 and 8, in an alternate embodiment of the small animal trap 10 the fingers 51 of the bait holder 11 have top ends 54 which are beveled downwardly from the centermost fingers 55 of the multitude to the outermost fingers 56. The top ends 54 of the fingers 51 therefore form a convex outline which laterally exposes the fingers so that they expose more of the bait which is embedded between the flexible fingers. The embodiment of the bait holder shown in FIGS. 7 and 8 has four parallel rows 58 and four parallel columns 59 of four fingers 51 each comprising a total of sixteen fingers 51. However, it is apparent that the fingers 51 may be arranged in various other patterns and shapes and utilizing other numbers of fingers 51 provided that the fingers 51 are arranged to firmly hold bait in the interstices 53 between them.

Figure 6:
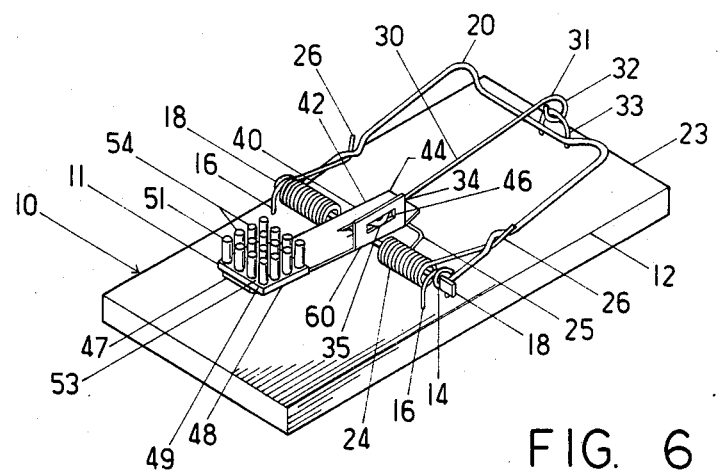
FIG. 6 is a perspective view of a small animal trap with a multifingered bait holder on the trigger mechanism of a second type of small animal trap having the touch-sensitive trigger mechanism pivotally mounted to the cross pin.

In the embodiment of the small animal trap with multifingered bait holder 10 shown in FIG. 1 the touch-sensitive trigger bar 40 also includes a pivoting portion 60 where the trigger mechanism 40 is mounted to the base 12. In the type of trap 10 shown in FIG. 1 the trigger bar 40 is pivotally mounted to the base 12 by means of a staple 62. In another type of trap 10 the trigger mechanism 40 is pivotally mounted onto the base 12 by way of being pivotally mounted to the cross pin 14 as shown in FIG. 6.

The bait holder 11 may be fastened to the trigger bar 40 by means of an adhesive such as epoxy base, caseinate, or other glue, or may be riveted or otherwise mechanically affixed to the bar.

The small animal trap 10 with multifingered bait holder 11 is capable of holding either small particles of bait such as cracker crumbs and bread crumbs, or paste-like bait substances, such as peanut butter in the interstices 53 between the fingers 51, as well as material such as relatively moist bread which can be somewhat molded into the interstices between the fingers. For example, a user may take some peanut butter, and smear it across the top ends 54 of the fingers 51 so that the peanut butter is forced down into the interstices 53 between the fingers 51. Alternatively, a user may drop small bits or crumbs of bait down into the interstices 53 between the fingers 51. The trap 10 is then placed on a flat surface such as a table top or floor, the jaw 20 is pulled back from the closed position to the latching end 23 of the base 12 and the latch bar 30 is placed over the jaw 20 so that the curved end portion 34 of the latch bar 30 is inserted into the hole 46 in the latching portion 42 of the touch-sensitive mechanism 40. The trap 10 is now ready for use and can be carefully placed wherever it is needed. When the animal to be trapped comes up and tries to take the bait, the animal finds that although it can see and smell the bait, it has difficulty removing it all. The animal therefore desperately attempts to remove the bait and disturbs the trigger bar 40, releasing the curved end portion 34 of the latch bar 30 from the opening 46 in the latching portion 42 which therefore allows the jaw 20 to snap shut and trap the animal.

It is to be understood that the present invention is not limited to the particular embodiments disclosed and illustrated herein, but embraces all such modified forms thereof as come within the scope of the following claims.

What is claimed is:

1. A small animal trap comprising:
   (a) a base;
   (b) biased jaw means pivotally mounted on the base for snapping from an open position to a closed position to trap the animal;
   (c) latching means for latching the jaw means in its open position when the trap is set and releasing the jaw means to close in response to a trigger actuation movement;
   (d) touch-sensitive trigger means for responding to small physical movement and vibrations to move the latching means so that the latching means releases the jaw means to close; and
   (e) a bait holder mounted to the touch-sensitive trigger means, the bait holder having a flat base with a top surface and a multitude of closely spaced fingers extending upwardly from the top surface to hold bait in the interstices between the fingers, wherein the fingers are arranged in parallel rows in one direction and in parallel columns perpendicular to said one direction.

2. The bait holder specified in claim 1 wherein there are sixteen fingers arranged in four rows and four columns, with four fingers in each row and column.

3. The bait holder specified in claim 1, wherein each finger has a top end which is rounded and all of the fingers are of equal height.

4. The bait holder specified in claim 1 wherein each finger has a top end, and the top ends of the multitude of fingers are beveled downwardly from the centermost fingers of the multitude to the outermost fingers, the tops of the fingers forming a convex outline so that more of the bait embedded between the fingers is exposed.

5. A touch-sensitive trigger mechanism for an animal trap having a base and a latch bar for restraining a spring activated jaw, the trigger bar mechanism including a trigger bar having latching portion near one end of the trigger bar with an opening therein adapted to receive and releasably hold a curved end portion of the latch bar when the trap is set, a bait holder at the other end of the trigger bar having a flat base with a top surface and a multitude of fingers extending upwardly therefrom to hold the bait in the interstices therebetween, and a pivot portion where the trigger bar is pivotally mounted to the trap base so that the latching portion of the trigger bar may receive and hold a curved end portion of the latch bar when the trap is set, and release the latch bar when the trigger bar is disturbed, thereby allowing the spring actuated jaw to snap to a closed position, wherein the fingers are arranged in parallel rows in one direction and in parallel columns perpendicular to said one direction.

6. The trigger mechanism specified in claim 5, wherein there are sixteen fingers arranged in four rows and four columns, with four fingers in each row and column.

7. The trigger mechanism specified in claim 5 wherein each finger has a top end which is rounded and all of the fingers are of equal height.

8. The trigger mechanism specified in claim 5 wherein each finger on the bait holder has a top end and the top ends of the multitude of fingers are beveled downwardly from the centermost fingers of the multitude to the outermost fingers, the top ends of the fingers forming a convex outline so that more of the bait embedded between the fingers is exposed.

9. A small animal trap comprising:
   (a) a base which may rest on a horizontal surface;
   (b) a cross-pin which at its ends is pivotally mounted to the base by two staples;
   (c) a jaw which is connected to the cross-pin at the ends thereof so that the jaw may pivot back and forth between two ends of the base;
   (d) a coil spring for actuating said jaw, mounted on the cross-pin, the coil spring having a portion extending therefrom to the base to provide resistance against the turning of the spring, and at least one arm extending also therefrom to engage the jaw and bear against the jaw so that it tends to close to an end of the base;
   (e) a latch bar with two ends, having a loop at one end through which the latch bar is pivotally mounted by a staple to an end of the base opposite the end of the base to which the jaw tends to close, and a curved end portion near the opposite end of the latch bar;
   (f) a touch-sensitive trigger mechanism including a trigger bar with two ends, a latching portion at one end of the bar with an opening therein adapted to receive and releasably hold the curved end portion of the latch bar when the trap is set;
   (g) a bait holder mounted at the other end of the trigger bar, said bait holder having a flat base with a top surface and a multitude of fingers extending therefrom to hold the bait in the interstices therebetween; and
   (h) means for pivotally mounting the trigger mechanism to the base such that the latching portion of the trigger bar may receive and hold the curved end portion of the latch bar when the trap is set, and release the latch bar when the trigger bar is disturbed so that the spring actuated jaw snaps to a closed position, wherein the fingers are arranged in parallel rows in one direction and in parallel columns perpendicular to said one direction.

10. The animal trap specified in claim 9 wherein there are sixteen fingers arranged in four rows and four columns, with four fingers in each row and column.

11. The animal trap specified in claim 11 wherein each finger has a top end which is rounded and all of the fingers are of equal height.

12. The animal trap specified in claim 11 wherein each finger on the trigger mechanism bait holder has a top end, and the top ends of the multitude of fingers are beveled downwardly from the centermost fingers of the multitude to the outermost fingers, the tops of the fingers forming a convex outline so that more of the bait embedded between the fingers is exposed.

13. A small animal trap comprising:
(a) a base;
(b) biased jaw means pivotally mounted on the base for snapping from an open position to a closed position to trap the animal;
(c) latching means for latching the jaw means in its open position when the trap is set and releasing the jaw means to close in response to a trigger actuation movement;
(d) touch-sensitive trigger means for responding to small physical movement and vibrations to move the latching means so that the latching means releases the jaw means to close; and
(e) a bait holder mounted to the touch-sensitive trigger means, the bait holder having a flat base with a top surface and a multitude of closely spaced fingers extending upwardly from the top surface to hold bait in the interstices between the fingers, wherein each finger has a top end, and the top ends of the multitude of fingers are beveled downwardly from the centermost fingers of the multitude to the outermost fingers, the tops of the fingers forming a convex outline so that more of the bait embedded between the fingers is exposed.

14. A touch-sensitive trigger mechanism for an animal trap having a base and a latch bar for restraining a spring activated jaw, the trigger bar mechanism including a trigger bar having latching portion near one end of the trigger bar with an opening therein adapted to receive and releasably hold a curved end portion of the latch bar when the trap is set, a bait holder at the other end of the trigger bar having a flat base with a top surface and a multitude of fingers extending upwardly therefrom to hold the bait in the interstices therebetween, and a pivot portion where the trigger bar is pivotally mounted to the trap base so that the latching portion of the trigger bar may receive and hold a curved end portion of the latch bar when the trap is set, and release the latch bar when the trigger bar is disturbed, thereby allowing the spring actuated jaw to snap to a closed position, wherein each finger on the bait holder has a top end and the top ends of the multitude of fingers are beveled downwardly from the centermost fingers of the multitude to the outermost fingers, the top ends of the fingers forming a convex outline so that more of the bait embedded between the fingers is exposed.

15. A small animal trap comprising:
(a) a base which may rest on a horizontal surface;
(b) a cross-pin which at its ends is pivotally mounted to the base by two staples;
(c) a jaw which is connected to the cross-pin at the ends thereof so that the jaw may pivot back and forth between two ends of the base;
(d) a coil spring for actuating said jaw, mounted on the cross-pin, the coil spring having a portion extending therefrom to the base to provide resistance against the turning of the spring, and at least one arm extending also therefrom to engage the jaw and bear against the jaw so that it tends to close to an end of the base;
(e) a latch bar with two ends, having a loop at one end through which the latch bar is pivotally mounted by a staple to an end of the base opposite the end of the base to which the jaw tends to close, and a curved end portion near the opposite end of the latch bar;
(f) a touch-sensitive trigger mechanism including a trigger bar with two ends, a latching portion at one end of the bar with an opening therein adapted to receive and releasably hold the curved end portion of the latch bar when the trap is set;
(g) a bait holder mounted at the other end of the trigger bar, said bait holder having a flat base with a top surface and a multitude of fingers extending therefrom to hold the bait in the interstices therebetween; and
(h) means for pivotally mounting the trigger mechanism to the base such that the latching portion of the trigger bar may receive and hold the curved end portion of the latch bar when the trap is set, and release the latch bar when the trigger bar is disturbed so that the spring actuated jaw snaps to a closed position, wherein each finger on the trigger mechanism bait holder has a top end, and the top ends of the multitude of fingers are beveled downwardly from the centermost fingers of the multitude to the outermost fingers, the tops of the fingers forming a convex outline so that more of the bait embedded between the fingers is exposed.

* * * * *

UNITED STATES PATENT AND TRADEMARK OFFICE
CERTIFICATE OF CORRECTION

PATENT NO. : 4,677,786
DATED : July 7, 1987
INVENTOR(S) : Marc Frank

It is certified that error appears in the above-identified patent and that said Letters Patent are hereby corrected as shown below:

Column 7, Line 8

"11" should read --9--.

Signed and Sealed this

Thirteenth Day of October, 1987

Attest:

DONALD J. QUIGG

Attesting Officer

Commissioner of Patents and Trademarks